Nov. 18, 1958     C. U. DEATON ET AL     2,860,584
BOLT AND LOCK CONSTRUCTION Original Filed Aug. 3, 1954     9 Sheets-Sheet 1

INVENTORS
CHARLES U. DEATON and
CARL D. GRABER
BY
*Frease & Bishop*
ATTORNEYS Nov. 18, 1958     C. U. DEATON ET AL     2,860,584
BOLT AND LOCK CONSTRUCTION
Original Filed Aug. 3, 1954     9 Sheets-Sheet 2

INVENTORS
CHARLES U. DEATON and
CARL D GRABER
BY Frease & Bishop
ATTORNEYS Nov. 18, 1958   C. U. DEATON ET AL   2,860,584
BOLT AND LOCK CONSTRUCTION
Original Filed Aug. 3, 1954   9 Sheets-Sheet 3

INVENTORS
CHARLES U. DEATON and
CARL D. GRABER
BY
*Frease & Bishop*
ATTORNEYS

Nov. 18, 1958    C. U. DEATON ET AL    2,860,584
BOLT AND LOCK CONSTRUCTION
Original Filed Aug. 3, 1954    9 Sheets-Sheet 6

INVENTORS
CHARLES U. DEATON and
CARL D. GRABER
BY Frease & Bishop
ATTORNEYS

Nov. 18, 1958

C. U. DEATON ET AL 2,860,584

BOLT AND LOCK CONSTRUCTION

Original Filed Aug. 3, 1954

*INVENTORS*
CHARLES U. DEATON and
CARL D. GRABER

BY *Frease & Bishop*

ATTORNEYS

Nov. 18, 1958   C. U. DEATON ET AL   2,860,584
BOLT AND LOCK CONSTRUCTION
Original Filed Aug. 3, 1954   9 Sheets-Sheet 9

INVENTORS
CHARLES U. DEATON and
CARL D. GRABER
BY Frease & Bishop
ATTORNEYS

United States Patent Office 2,860,584
Patented Nov. 18, 1958

2,860,584

BOLT AND LOCK CONSTRUCTION

Charles U. Deaton, Kirkwood, Mo., and Carl D. Graber, Orrville, Ohio, assignors to Diebold, Incorporated, Canton, Ohio, a corporation of Ohio Original application August 3, 1954, Serial No. 447,544. Divided and this application October 6, 1955, Serial No. 538,841

11 Claims. (Cl. 109—59)

The invention or discovery relates to bolt and lock construction for vault doors and the like, and the present invention or discovery is a division of the disclosure set forth in the application for United States Letters Patent of Charles U. Deaton and Carl D. Graber for Vault Door Construction, filed August 3, 1954, Serial No. 447,544.

Prior to the present invention or discovery bolt bars have been used on vault doors which have had spaced mounting means such as pins extending from the door through slots in the bolt bars. Such mounting means do not provide a strong and rigid interaction between the bolt bar and the door throughout the entire length of the bolt bar.

The objects of the present invention or discovery include the provision of a bolt bar and means operatively mounting the bolt bar on a vault door in such manner that there is strong and rigid interengagement between the bolt bar and the door continuously from top to bottom of the door.

Further objects of the present invention or discovery include the incorporation in such a bolt bar construction of an in-built pressure system, and actuating means for the bolt bar adapted to exert great pressure in the in-built pressure system.

Further objects of the present invention or discovery include the provision of such an improved bolt and lock construction which has a simplified construction and arrangement of its component parts, such parts being capable of economical manufacture and assembly, and the improved construction being capable of easy operation and easy and economical maintenance.

The foregoing and other objects are attained by the bolt and lock construction, parts, combinations, and sub-combinations, which comprise the present invention or discovery, the nature of which is set forth in the following general statement, and preferred embodiments of which, together with their mode of use, are set forth by way of example in the following description, and which are particularly and distinctly pointed out and set forth in the appended claims forming part hereof.

The nature of the improved bolt and lock construction of the present invention or discovery may be stated in general terms with reference to a vault door construction including members forming a rectangular door frame having a rectangular opening, a door movable into and out of plug fitting location in the opening, the door frame including opposite vertical side members, and a top hinge mechanism and a bottom hinge mechanism operatively interposed between one side of the door and one of the frame side members.

The top hinge mechanism includes roller means which supports the entire load of the door and means resisting tilting of the door, and the bottom hinge mechanism includes means resisting tilting of the door. Each hinge mechanism includes a housing connected with the door and a housing connected with the supporting frame side member, and each hinge mechanism includes a hinge pin located in the frame connected housing and extending into the door connected housing, and means are interposed between each hinge pin and its associated door connected housing for moving the door towards and away from the frame.

At the other side of the door there is operatively mounted one unit of a door and frame engaging mechanism including another unit located in the other frame side member. The door and frame engaging mechanism is operative for making an engagement between the door and the frame when the door is closed and for moving that portion of the door on which the one unit is mounted towards and away from the frame.

Bolt work for the door including the improved bolt and lock construction of the present invention or discovery, includes two longitudinally extending bolt bars operatively mounted on the rear of the door and extendable and retractable to and from engaging relationship with end faces of side members of the frame. The door has rear portions provided with flanges. Each bolt bar is U-shaped in cross-section and has one U-leg engageable with one of the door flanges, and the another U-leg engageable with a rear end of one of the door frame side members. Means are provided for extending and retracting the bolt bars to and from engagement with rear end faces of the door frame side members, and the extending and retracting means including a toggle mechanism.

Common operating mechanism is mounted on the door and operatively associated with the hinge mechanisms, the door unit of the separable door and frame engaging mechanism, and the bolt work. The common operating mechanism is actuable by a rotatable spoke handle unit projecting from the front face of the door.

By way of example, embodiments of the improved bolt and lock construction as part of a vault door construction and parts thereof, of the present invention or discovery are illustrated in the accompanying drawings forming part hereof, in which.

Similar numerals refer to similar parts throughout the several views of the drawings.

The following descriptive specification is contained in consecutive sections, which are entitled as follows:

I. General construction.
II. The bolt work.

I. General construction

The improved vault door construction is indicated generally by 10, and includes members forming a rectangular door frame indicated generally by 11 which is located at the front end of a rectangular vestibule indicated generally by 12. An improved vault door indicated generally by 13 is supported at one side 14 on one of the composite side members 15 of the door frame by an improved top hinge mechanism indicated generally by 16, and by an improved bottom hinge mechanism indicated generally by 17.

At the other side 18 of the door 13 there is operatively mounted one unit indicated generally by 19 of a separable door and frame engaging mechanism. The other unit indicated generally by 20 of the separable door and frame engaging mechanism is located in the other composite frame side member 21.

The bolt work for the door is indicated generally by 22 and is operatively mounted on the rear of the door.

Common operating mechanism indicated generally by 23 is operatively associated with the hinge mechanisms 16 and 17, the unit 19 of the separable door and frame engaging mechanism, and the bolt work 22. The common operating mechanism 23 is actuatable by a rotatable spoke handle unit indicated generally by 24 projecting from the front face 25 of the door 13.

Referring particularly to Figs. 6, 7, 8, and 9, the door 13 is of composite construction and includes a rectangular case constituted by a front plate 26, a back plate 27, a top member 28, a bottom member 29, and side members 30 and 31. In the interior 32 of the door case formed by these plates and members, there is located in a usual manner a relatively thick torch resistant block 33 in the forward portion of the case 32, and a drill resistant plate 34 between the block 33 and the back plate 27.

Figure 10:
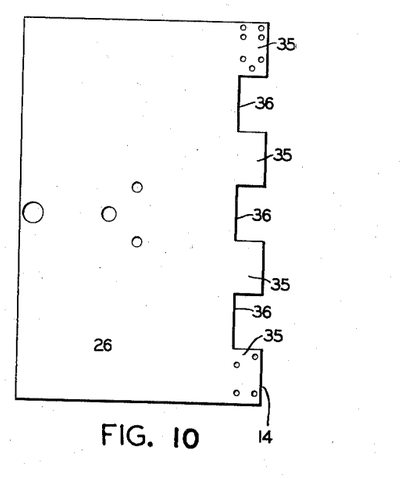
Fig. 10 is a detached elevational view of the front plate of the door.

As best shown in Fig. 10 the door case front plate 26 at the side 14 of the door is formed with alternating tongues 35 and notches 36, each tongue and each notch being rectangular and being sized to interfit with clearance in a registering notch or tongue formed in the frame side member 15.

Figure 4:
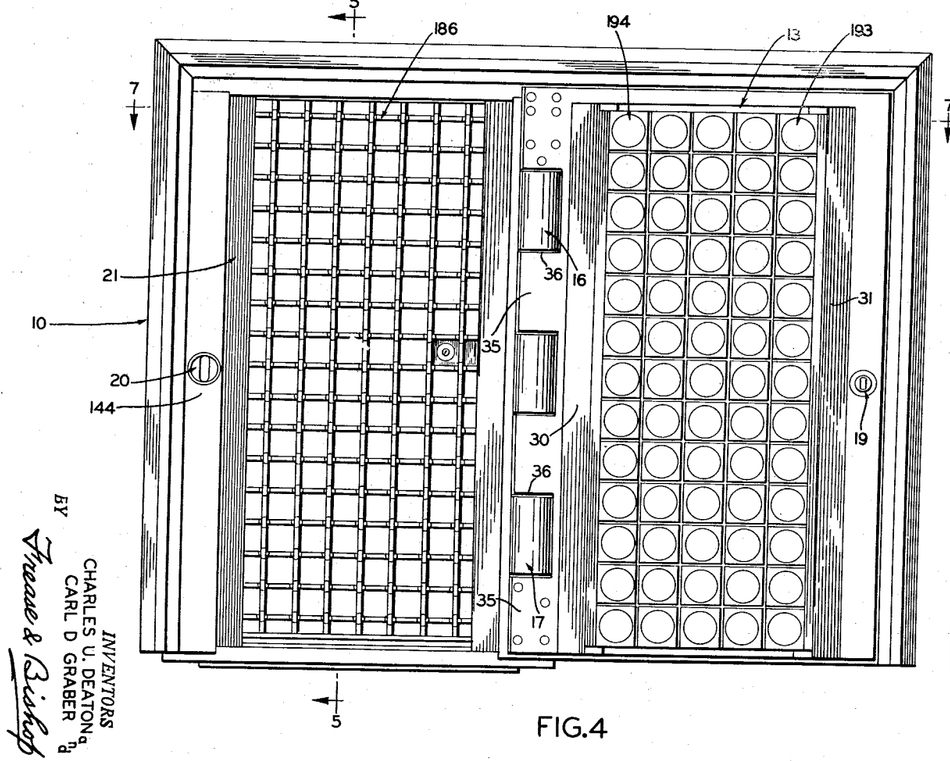
Fig. 4 is a view similar to Fig. 1, showing the door in the open position, and the day gate in the closed position.
Figure 5:
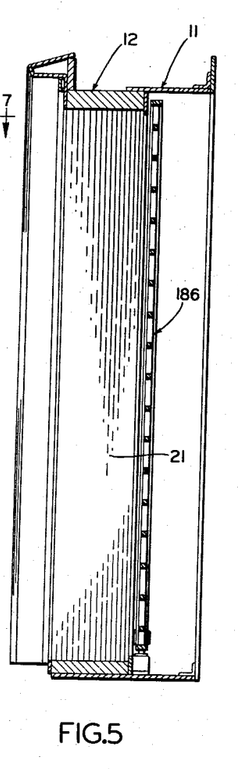
Fig. 5 is a vertical transverse sectional view thereof, as on line 5—5, Fig. 4, looking in the direction of the arrows.

The top tongue 35 of the door frame plate 26 mounts parts of the top hinge mechanism 16, as best shown in Fig. 4. Other parts of the top hinge mechanism 16 are supported on the immediately adjacent tongue of the door frame side member 15.

II. The bolt work

The improved vault door construction 13 includes improved bolt work 22 and associated parts which are best illustrated in Figs. 1, 3, 4, 6, 7, 8, 9, and 11 to 28 inclusive.

As above described, the door frame 11 includes a composite frame side member 21 composed of a sloping seal member 21–1 and a vertical front frame finish plate 144. The door frame 12 also includes a composite frame side member 15 including a seal member 180 which slopes from front to rear laterally from the larger front end opening of the frame to the smaller rear end opening thereof. The composite member 15 also includes a vertical front frame finish plate 181 which mounts the lower housing and bearing block of the top hinge mechanism 16 and the lower housing and bearing block of the bottom hinge mechanism 17.

At the back end of the sloping frame seal member 21–1 there is secured a wedge bar 182 extending longitudinally the length of the seal member 21–1 and making an inner side junction therewith at the longitudinally extending corner 183. The wedge bar 182 extends laterally outwardly from the corner 183.

At the back end of the sloping frame seal member 180 there is secured a wedge bar 184 extending longitudinally the length of the seal member 180 and making an inner side junction therewith at the longitudinally extending corner 185.

Figure 7:
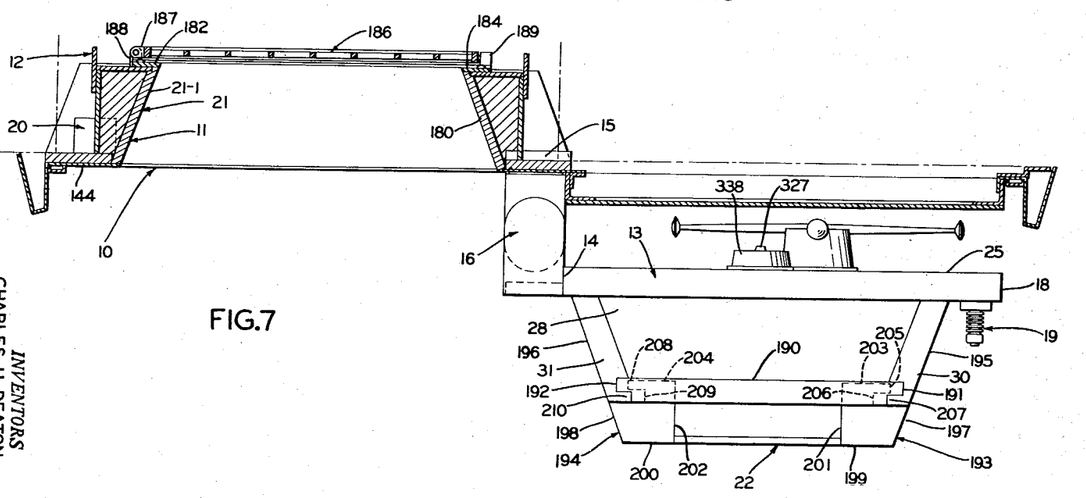
Fig. 7 is an enlarged horizontal sectional view of the door and frame, as on line 7—7, Fig. 4, looking in the direction of the arrows.
Figures 8, 9:
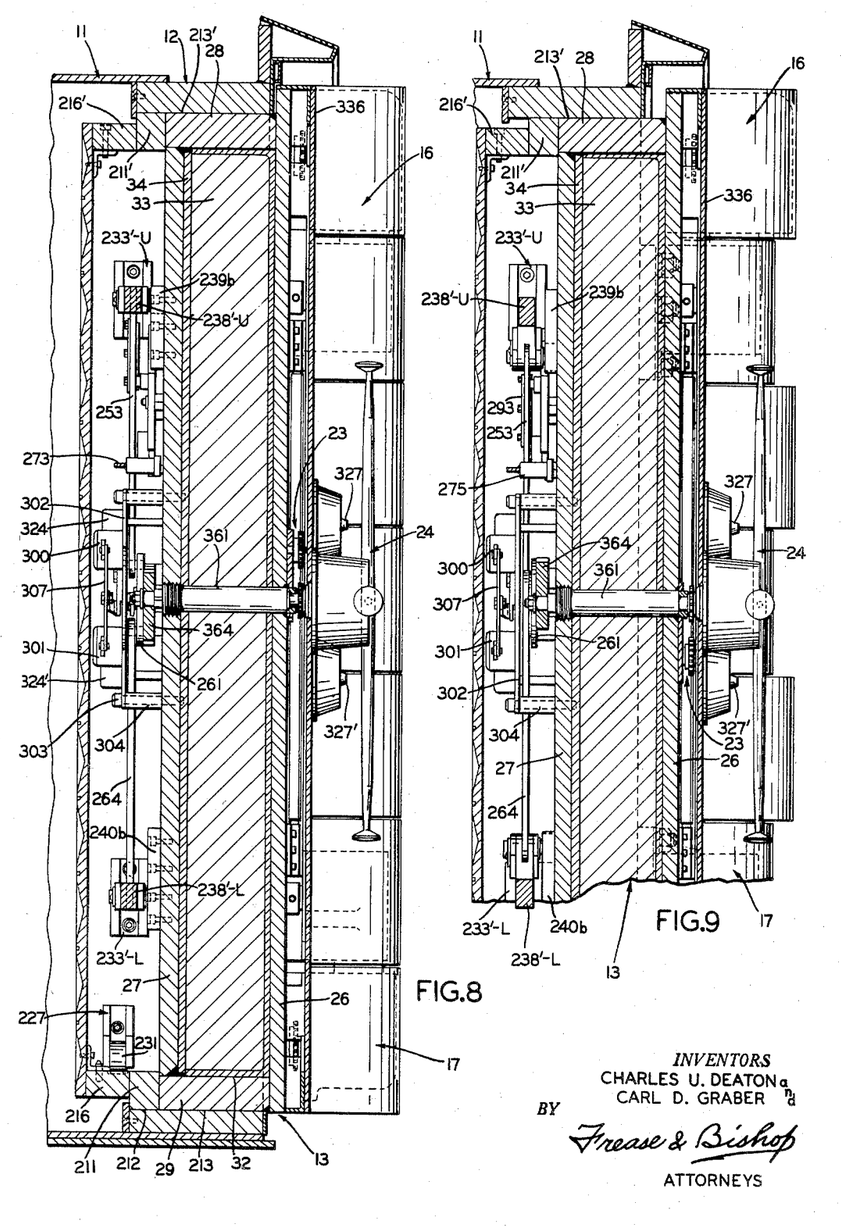
Fig. 8 is an enlarged vertical transverse sectional view of the door and frame, as on line 8—8, Fig. 1, looking in the direction of the arrows.
Fig. 9 is a view similar to Fig. 8, showing the door in its position after its operating mechanism has been actuated to perform initial steps in the door opening cycle, whereby the door has been moved horizontally from its plug sealing position in the opening of the door frame, to a position displaced forwardly from the door frame.

A rectangular day-gate indicated generally by 186 includes a hinge side member 187. Hinges 188 connect the day-gate hinge side member 187 to the wedge bar 182 at positions laterally spaced from the corner 183. The day-gate 186 also includes a lock catch side member 189 which overlaps the wedge bar 184, when the vault door 13 is open and the day-gate is closed, as best shown in Fig. 7.

Figure 6:
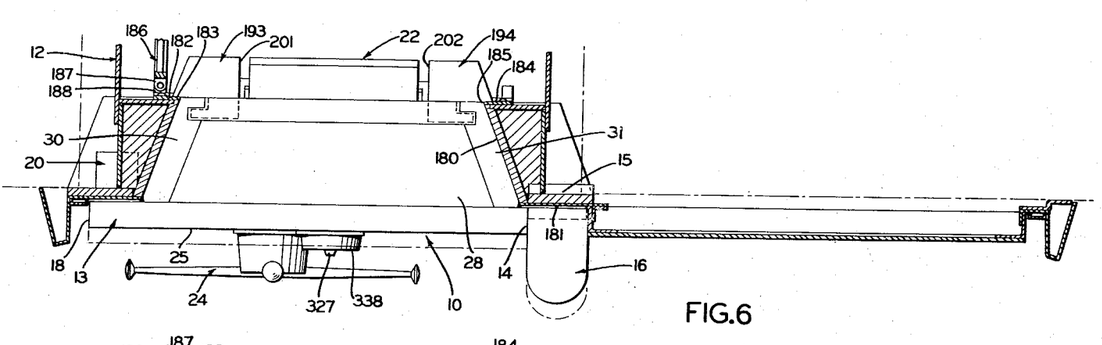
Fig. 6 is an enlarged horizontal sectional view of the door and frame, as on line 6—6, Fig. 1, looking in the direction of the arrows.

When the day-gate is open and the vault door is closed as shown in Fig. 6, the cleared portions of the wedge bars 182 and 184 extending laterally from the corners 183 and 185, constitute vertical keeper wedge bars extending from top to bottom of the rear end opening of the door frame 11.

The bolt work 22 is operatively mounted on the back plate 27 of the door case, and the door case side members 30 and 31 project beyond the outer face 190, and the door case side members 30 and 31 have formed therein, respectively, beyond the outer face 190 of the door case side members 30 and 31, laterally opening longitudinally extending vertical grooves 191 and 192.

At the sides of the door case back plate 27, there are operatively mounted in a novel manner vertical bolt bars 193 and 194, which extend longitudinally from top to bottom of the door case. The bolt bar 193 is located at the swinging side of the door adjacent the door case side member 30, and the bolt bar 194 is located at the hinge side of the door adjacent the door case side member 31.

The door case side members 30 and 31 are formed, respectively, with laterally sloping outer faces 195 and 196 which complement and fit with the outer sloping faces of the door frame seal members 21-1 and 180, when the door 13 is closed in the opening of the frame 11.

In Fig. 6, the door 13 is shown closed in the opening of the door frame 11, and the bolt bars 193 and 194 are shown in their laterally extended positions overlapping the door frame keeper wedge bars 182 and 184.

In Fig. 7, the door 13 is shown swung to the fully open position, with the bolt bars 193 and 194 in their laterally retracted positions. The bolt bar 193 has a longitudinally extending side face 197 which has the same lateral slope as that of the door case outer side face 195, and in the retracted position of the bolt bars, the bolt bar side face 197 is aligned with the door case side face 195. Similarly, the bolt bar 194 has a longitudinally extending side face 198 which has the same lateral slope as that of the door case outer side face 196, and in the retracted position of the bolt bars, the bolt bar side face 198 is aligned with the door case side face 196.

The bolt bars 193 and 194 are formed respectively with co-planar back faces 199 and 200, opposite inner side faces 201 and 202, and co-planar front faces 203 and 204. The back faces 199 and 200 are parallel with the front faces 203 and 204, and the inner side faces 201 and 202 are perpendicular to the front and back faces.

The outer front corner of the bolt bar 193 is formed with a front tongue 205 and an intermediate groove 206, the tongue and the groove extending longitudinally the length of the bolt bar. The tongue 205 extends laterally outwardly, and the groove 206 opens laterally outwardly.

The door case side member 30, as above stated, has an inwardly opening groove 191 formed therein, and is also formed with a laterally inwardly extending tongue 207 forming one side of the groove 191.

The bolt bar tongue 205 is aligned with and extends into the door case side member groove 191, and the door case side member tongue 207 is aligned with and extends into the bolt bar groove 206.

Similarly the outer front corner of the bolt bar 194 is formed with a front tongue 208 and an intermediate groove 209, the tongue and the groove extending longitudinally the length of the bolt bar. The tongue 208 extends laterally outwardly, and the groove 209 opens laterally outwardly.

The door case side member 31, as above stated, has an inwardly opening groove 192 formed therein, and is also formed with a laterally inwardly extending tongue 210 forming one side of the groove 192.

The bolt bar tongue 208 is aligned with and extends into the door case side member groove 192, and the door case side member tongue 210 is aligned with and extends into the bolt bar groove 209.

Figures 1, 3:
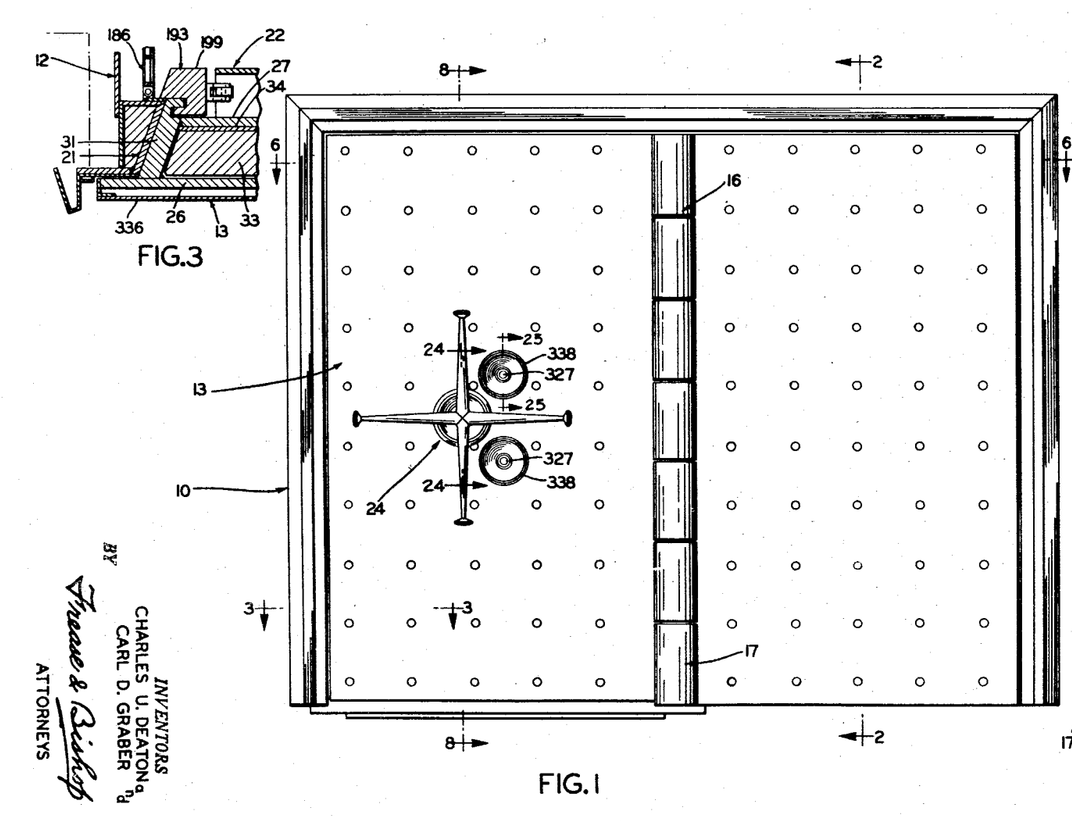
Fig. 1 is a front elevational view of a preferred embodiment of the improved vault door construction, showing the outside or front faces of the door and frame, the door being in the closed position.
Fig. 3 is a fragmentary horizontal sectional view thereof, as on line 3—3, Fig. 1, looking in the direction of the arrows, showing details of the improved bolt and lock construction.
Figure 2:
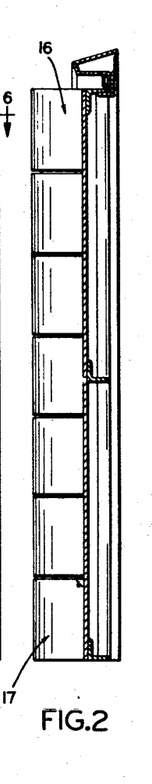
Fig. 2 is a vertical transverse sectional view thereof, as on line 2—2, Fig. 1, looking in the direction of the arrows.
Figure 12:
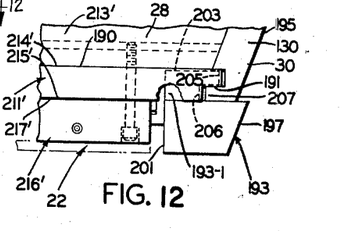
Fig. 12 is a fragmentary top plan view thereof, as on line 12—12, Fig. 11, looking in the direction of the arrows.
Figure 13:
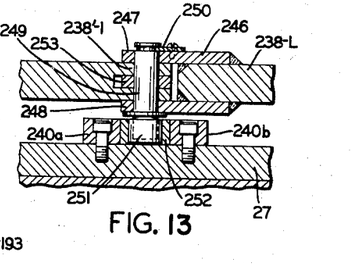
Fig. 13 is a fragmentary plan sectional view thereof, as on line 13—13, Fig. 11, looking in the direction of the arrows.
Figure 17:
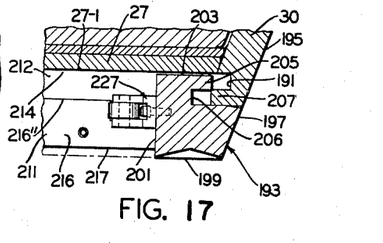
Fig. 17 is a fragmentary transverse sectional view thereof as on line 17—17, Fig. 16, looking in the direction of the arrows.
Figure 18:
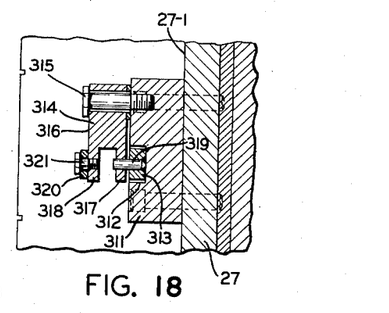
Fig. 18 is a fragmentary vertical sectional view thereof, as on line 18—18, Fig. 16.
Figure 19:
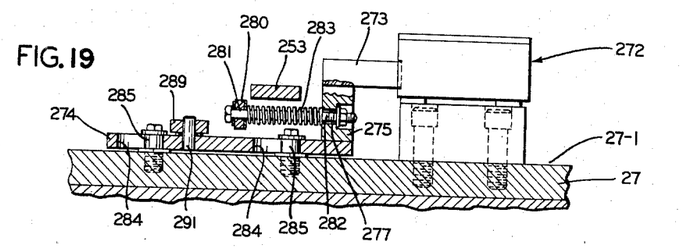
Fig. 19 is a fragmentary transverse sectional view of the door, as on line 19—19, Fig. 11, looking in the direction of the arrows.

The immediately foregoing details of construction are best shown in Figs. 3, 6, and 7, and in Figs. 12 and 17.

Figure 11:
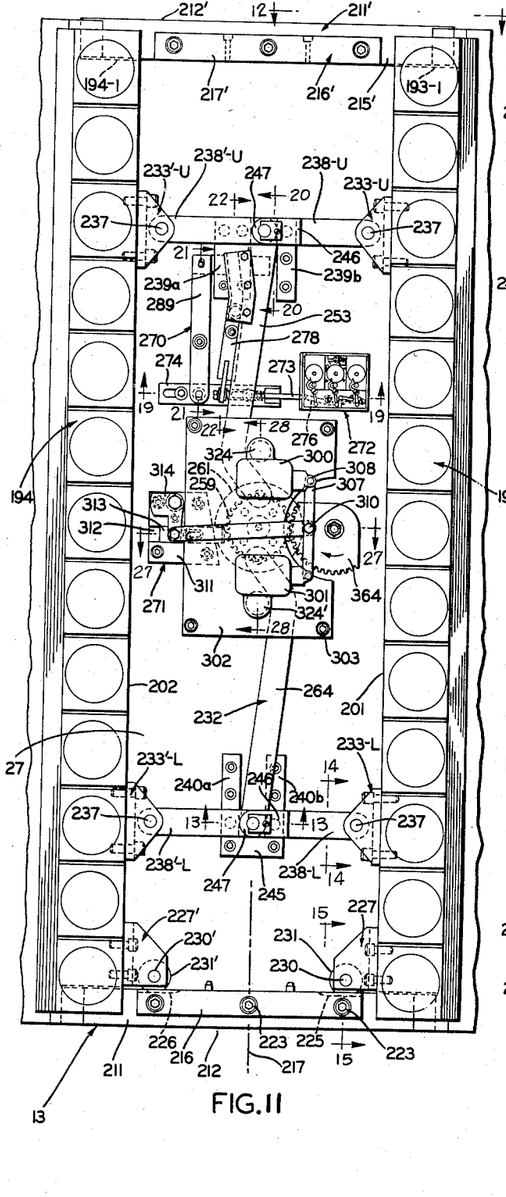
Fig. 11 is an enlarged fragmentary view of the rear of the door with the bolt or wedge locking bars in the extended position, and the rear cover plate removed, and showing the bolt work and associated parts.
Figure 14:
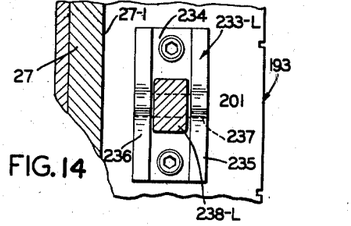
Fig. 14 is a fragmentary vertical sectional view thereof, as on line 14—14, Fig. 11, looking in the direction of the arrows.
Figure 15:
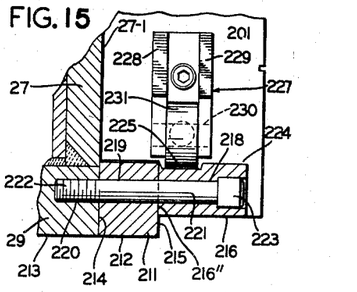
Fig. 15 is another fragmentary sectional view thereof, as on line 15—15, Fig. 11, looking in the direction of the arrows.
Figure 16:
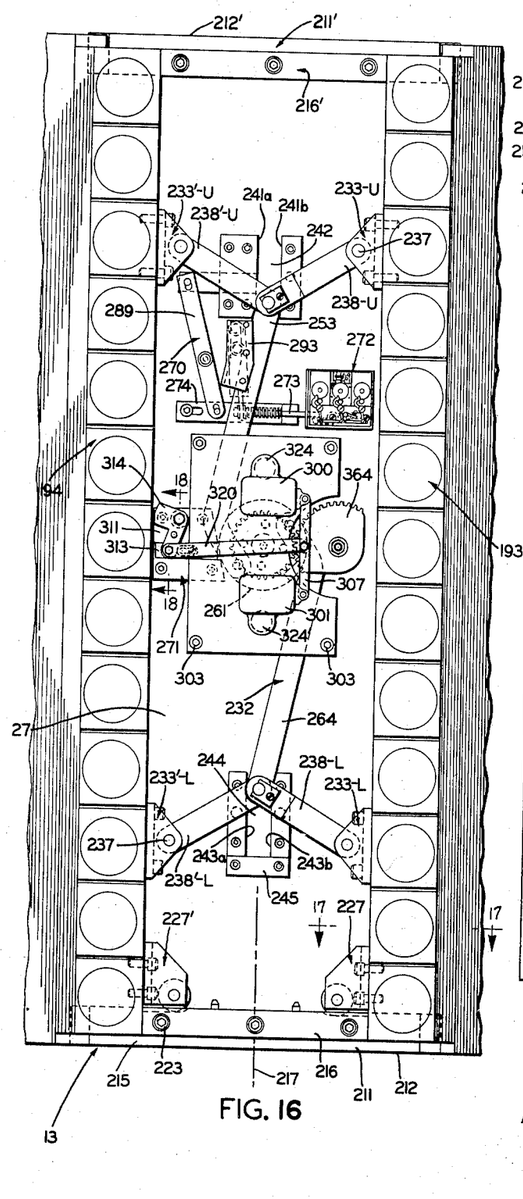
Fig. 16 is a view similar to Fig. 11, showing the bolt bars in the retracted position.

Referring in particular to Figs. 11 to 17, inclusive, and more particularly to Figs. 11 and 16, at the lower end of the door 13 there is located a laterally extending elongated spacer bar 211 having a rectangular cross-section and a bottom face 212 aligned with the bottom face 213 of the door case bottom member 29.

The front face 214 of spacer bar 211 abuts the back face of door case bottom member 29, Fig. 15. The bottom face 213 of the door case bottom member 29, is aligned with the bottom face of the door case side members 30 and 31.

The top face of the door case top member 28, also is aligned with the top faces of the door case side members 30 and 31, Fig. 12.

The spacer bar 211 also has a back face 215, and an elongated track bar 216 has a front face 216'' abutting the back face 215 of the spacer bar 211, the track bar being in side by side alignment with the spacer bar 211 and having a length substantially less than the length of the spacer bar. The track bar 216 extends equal distances from opposite sides of a vertical median plane perpendicular to the back face 27-1 of the door case back plate 27, and indicated by the dot-dash line 217 in Figs. 11 and 16.

The track bar 216, and the spacer bar 211 have formed therein a plurality of sets of registering bores, each set including a countersunk bore 218 in the track bar 216 and a bore 219 in the spacer bar 211, and the bores 218 and 219 of each set register with an internally threaded socket 220 formed in the door case bottom member 29. A plurality of cap screws 221 secure the track bar 216 and the spacer bar 211 to the door case back plate 27, each cap screw 221 having a threaded shank 222 extending through one of the sets of registering bores 218 and 219 and screwed into the registered socket 220, and each cap screw 221 having a head 223 located in the countersink of the associated bore 218 and clamping the track bar 216 and spacer bar 211 against the door case back plate 27, as shown in Fig. 15.

The track bar 216 has an upper face 224 in the opposite ends of which there are formed track grooves 225 and 226. At the lower end of the bolt bar 193 there is mounted a U-shaped shaft hanger block 227 having rearwardly extending legs 228 and 229 which have formed therein horizontally aligned bores in which are mounted the ends of a shaft 230. A wheel 231 is located between the block legs 228 and 229, and the wheel 231 has a central bore through which the shaft 230 extends.

The wheel 231 is externally cylindrical and is supported by and rolls on the track bar 216. As shown, the wheel 231 rolls in and is guided by the track groove 225. The load applied to the wheel 231 by the supported bolt bar 193 is thus eccentric to the axis of rotation of the wheel 231.

At the upper end of the door 13, there is located a laterally extending elongated spacer bar 211' having a rectangular cross-section and a top face 212' aligned with the top face 213' of the door case top member 28. The front face 214' of the spacer bar 211' abuts the back face of door case top member 28, Fig. 12. The top face 213' of the door case top member 28 is aligned with the top faces of the door case side members 30 and 31.

The upper spacer bar 211' also has a back face 215', and an elongated clamp and stop bar 216' has a front face 217' abutting the back face 215' of the spacer bar 211', the clamp and stop bar 216' being in side-by-side alignment with the spacer bar 211' and having a length substantially less than the length of the spacer bar.

The clamp and stop bar 216' and the spacer bar 211' are separably secured to the upper end of the door case back plate 27, by means similar to those above described which separably secure the track bar 216 and spacer bar 211 to the door case back plate 27.

As best shown in Fig. 12, the upper end of the bolt bar 193 is formed with a front rabbet notch 193-1, and upper spacer bar 211' extends over the notch 193-1, and acts as a hold-down for the upper end of the bolt bar 193.

Combined plumbing and moving means are provided for maintaining the eccentrically supported bolt bar 193 in laterally movable positions in each of which, each of the exterior faces of the bolt bar 193 including the side face 201 is plumb or vertical, and the combined plumbing and moving means being operative to move the bolt bar 193 laterally to its extended position as shown in Fig. 11, and therefrom to its retracted position as shown in Fig. 16.

The combined plumbing and moving means is constituted in part by a multiple linkage indicated generally by 232 and including an upper pivot pin mounting block 233–U and a lower pivot pin mounting block 233–L each being secured to the bolt bar 193 and extending from its side face 201 towards the median plane 217.

Each of the blocks 233–U and 233–L is of identical construction, and the block 233–L is described in detail with particular reference to Fig. 14, as follows: The block 233–L has a cross-section which is generally U-shaped, and includes a back web 234 which abuts against the side face 201 of the bolt bar 193. Spaced legs 235 and 236 extend laterally from the back web, and the legs 235 and 236 have formed therein aligned bores which support the ends of a pivot pin 237.

The multiple linkage 232 furthermore includes an upper cross link bar 238–U and a lower cross link bar 238–L. The outer end of the upper cross link bar 238–U is located between the legs of the upper block 233–U and has a bore formed therein through which extends the pin 237 in the upper block. Similarly, the outer end of the lower cross link bar 238–L is located between the legs of the lower block 233–L and has a bore formed therein through which extends the pin 237 in the lower block.

As parts co-acting with the multiple linkage 232, there are mounted on the door case back plate 27, a set of upper roller guide blocks 239a and 239b, and a set of lower roller guide blocks 240a and 240b. The upper blocks 239a and 239b have, respectively, opposite inner vertical side faces 241a and 241b, equally spaced on opposite sides of the median plane 217 and forming therebetween an upper vertical roller guide groove 242.

The lower blocks 240a and 240b have, respectively, opposite inner vertical side faces 243a and 243b equally spaced on opposite side faces of the median plane 217 and forming therebetween a lower vertical roller guide groove 244. In abutment with the lower ends of the blocks 240a and 240b, there is secured to the door case back plate 27 a roller stop block 245.

On the outer end of each of the link bars 238–U and 238–L, there is constructed a clevis 246 including an outer leg 247 and an inner leg 248 having aligned bores formed therein, and upper portions of a pin 249 are located in the bores of the clevis legs 247 and 248 and secured in the clevis as by an upper arcuate securing plate 250 separable connected on the outer face of the outer clevis leg 247 and engaging an outwardly opening groove in the upper end of the pin 249 extending above the upper clevis leg 247.

The lower end of the pin 249 extends below the lower clevis leg 248 and has a journal and thrust cup 251 secured thereon, and a roller 252 is journalled on the cup 251 and rolls between the guide block side faces for the particular upper or lower roller. The bottom of each of the upper and lower grooves 242 and 244 formed by the upper and lower roller guide blocks, serves as a slide bearing for the bottom circular thrust face of the particular cup 251 operating in the particular groove.

The multiple linkage 232 furthermore includes an upper connecting link bar 253, the upper end of which is located between the upper clevis legs 247 and 248, and has a bore formed therein through which extends the upper portion of the pin 249.

Referring in particular to Figs. 27 and 28, and again to Figs. 11 and 16, substantially at the center horizontal axis of the door indicated by the dot-dash line 254 in Fig. 28, there is mounted a stub shaft 255 having an inner externally threaded end 256 screwed into an internally threaded socket formed in the door case back plate 27. The shaft 255 furthermore includes an intermediate annular shoulder 257 which seats against the outer face 27–1 of the back plate 27. The shaft 255 also mounts on its outer end, needle bearings 258 which mount a gear wheel 259.

From the outer face of the gear wheel 259, there protrudes a pilot boss 260 having an externally cylindric surface concentric with the axis 254, and a crank disk 261 has a central cylindrical opening 262 formed therein which fits on the pilot boss 260, the inner face of the disk 261 abutting the outer face of the gear wheel 259, and means being provided which secure the disk 261 to the gear wheel 259.

From the upper side of the disk 261, there extends outwardly an upper crank pin 263, and the lower end of the upper connecting link bar 253 has a bore formed therein which fits on the upper crank pin 263.

As above stated, the lower cross link bar 238–L also has a clevis 246 constructed on its outer end and mounting a clevis pin 249 on the inner end of which there is mounted a journal and thrust cup 251 journalling a roller 252 which rolls in the lower groove 244.

A lower connecting link bar 264 has its lower end located between the legs of the lower clevis 246 and formed with a bore through which extends the outer portion of the lower clevis pin 249.

The crank disk 261 also mounts a lower crank pin 265, and the upper end of the lower connecting link bar 264 is formed with a bore which fits on the lower crank pin 265.

The multiple linkage 232 and associated parts as so far described, constitute an independent and complete combined plumbing and moving means operatively associated with the vertical bolt bar 193, and actuable by reverse quarter rotations of the crank disk 261 to move the bolt bar 193 laterally back and forth between the positions shown in Figs. 11 and 16.

At the lower end of the bolt bar 194, there is mounted a U-shaped shaft hanger block 227' which is identical in construction with the block 227 but reversed sideways. The block 227' mounts a shaft 230' and a wheel 231' which is supported by and rolls on the track bar 216. As shown the wheel 231' rolls in and is guided by the track groove 226. The load applied to the wheel 231' by the supported bolt bar 194 is thus eccentric to the axis of rotation of the wheel 231'.

As best shown in Fig. 11, the upper end of the bolt bar 194 is formed with a front rabbet notch 194–1, and upper spacer bar 211' extends over the notch 194–1, and acts as a hold-down for the upper end of the bolt bar 194.

Combined plumbing and moving means are provided for maintaining the eccentrically supported bolt bar 194 in laterally movable positions in each of which each of the exterior faces of the bolt bar 194 including the side face 202 is plumb or vertical, and the combined plumbing and moving means being operative to move the bolt bar 194 laterally to its extended position as shown in Fig. 11, and therefrom to its retracted position as shown in Fig. 16.

The combined plumbing and moving means for the bolt bar 194 includes linkage parts connected with parts of the multiple linkage 232, as follows: An upper pivot pin mounting block 233'–U and a lower pivot pin mounting block 233'–L are secured to the bolt bar 194 and extend from its side face 202 towards the median plane 217.

Each of the blocks 233'–U and 233'–L are identical in construction with the block 233–U and 233–L, but reversed sideways.

Each block 233'–U and 233'–L supports a pin 237.

An upper cross link bar 238'-U has its outer end located between the legs of the upper block 233'-U and has a bore formed therein through which extends the pin 237 in the upper block. The inner end of the upper cross link bar 238'-U is formed as a clevis 238'-1, the legs of which fit between the legs of the clevis 246 of the upper cross link bar 238-U. The legs of the clevis 238'-1 have formed therein aligned bores which register with the aligned bores of the upper clevis 246. The upper end of the upper connecting link bar 253 fits between the legs of the upper clevis 238'-1 and its bore is aligned with the bores of the legs of the upper clevises 246 and 238'-1, and the upper pivot pin 249 extends through all of the aligned bores.

Similarly, a lower cross link bar 238'-L has its outer end located between the legs of the lower block 233'-L and has a bore formed therein through which extends the pin 237 in the lower block. The inner end of the lower cross link bar 238'-L is formed as a clevis 238'-1, the legs of which fit between the legs of the clevis 246 of the lower cross link bar 238-L. The legs of the clevis 238'-1 of the lower cross link bar 238'-L have formed therein aligned bores which register with the aligned bores of the lower clevis 246. The lower end of the lower connecting link bar 264 fits between the legs of the lower clevis 238'-1, and its bore is aligned with the bores of the legs of the lower clevises 246 and 238'-1, and the lower pivot pin 249 extends through all of the aligned bores.

The multiple linkage formed by the pivot pin connected, crank disk 261, the upper and lower connecting link bars 253 and 264, the upper and lower cross link bars 238'-U and 238'-L, and the upper and lower blocks 233'-U and 233'-L and other co-acting parts constitute independent combined plumbing and moving means for the bolt bar 194.

The inclusion of the crank disk 261 and the upper and lower connecting link bars 253 and 264 in the linkage 232 constitutes a pair of co-acting linkages having common actuating parts for simultaneously plumbing and moving the bolt bars 193 and 194.

In the improved vault door construction 10, after the bolt bars 193 and 194 have been moved laterally to the extended positions shown in Figs. 3, 6, 11, and 12, the vault door 13 is bolted in the opening of the door frame 11, and the two stop mechanisms indicated generally by 270 and 271, respectively, are provided for blocking operation of the plumbing and moving means associated with the bolt bars 193 and 194 to move the bolt bars from the extended position to the retracted position.

The stop mechanism 270 is operatively mounted on the back face 27-1 of the door case back plate 27 and is located above the stub shaft 255 and below the upper cross link bars 238-U and 238'-U. Most of the parts of the stop mechanism 270 are located between the median plane 217 and the bolt bar 194. The stop mechanism 270 is time lock controlled by a time lock indicated generally by 272 which is mounted on the back face 27-1 of the door case back plate 27 and is located above the stub shaft 255 and below the upper cross link bar 238-U and between the median plane 217 and the bolt bar 193.

The stop mechanism 270 includes among other parts, a plunger 273 extending horizontally from a horizontal cross bar 274 mounted for horizontal movement on the door case back plate 27. At its end adjacent the time lock 272, the cross bar 274 has mounted thereon a rearwardly extending lug 275, which is spring pressed towards the time lock 272. The time lock 272 includes a stop arm 276 which in the locked position of the parts of the time lock as shown in Fig. 11, is in a position blocking movement of the plunger 273 and cross bar 274 towards the time lock. When the time lock parts have moved to the unlocked position shown in Fig. 16, the stop arm 276 has been moved to a position permitting movement of the plunger 273 into the case of the time lock.

Referring particularly to Figs. 11, 16, and 19 to 23, inclusive, the lug 275 is formed with a counter bored aperture 277, a swing bar 278 extending generally upwardly and downwardly, has a pivot mounting means 279 intermediate its ends, the pivot mounting means being secured on and extending outwardly from the door case back plate 27. At the lower end of the swing bar 278, there is secured an end piece 280 having an aperture 281 formed therein which is aligned with the aperture 277 in the lug 275.

A bolt and nut set 282 connect the end piece 280 and the lug 275, the shank of the bolt extending through the aligned apertures 277 and 281, and a helical compression spring 283 is interposed and reacts between the end piece 280 and the lug 275, and as shown the spring 283 is wound around the shank of the bolt of the set 282.

The cross bar 274 has formed therein a pair of aligned laterally spaced elongated horizontal slots 284, and a roller 285 is located in each slot 284, each roller 285 being stud mounted on the door case back plate 27.

Figure 20:
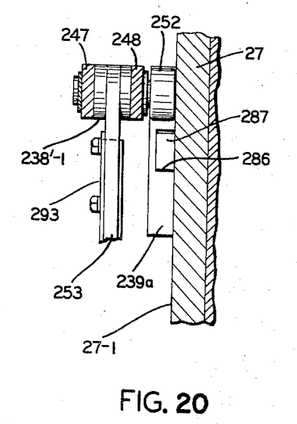
Fig. 20 is a fragmentary vertical sectional view of the door, as on line 20—20, Fig. 11, looking in the direction of the arrows.
Figure 21:
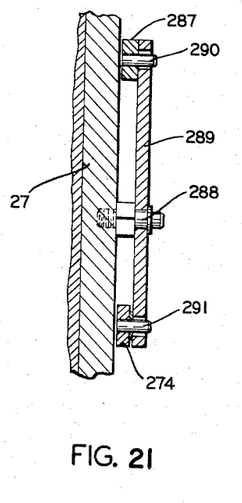
Fig. 21 is another fragmentary vertical sectional view of the door, as on line 21—21, Fig. 11, looking in the direction of the arrows.
Figure 22:
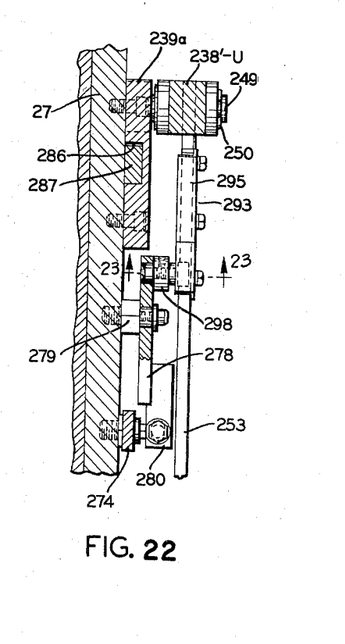
Fig. 22 is another fragmentary vertical sectional view of the door, as on line 22—22, Fig. 11, looking in the direction of the arrows.

As best shown in Fig. 20, the upper roller guide block 239a has formed therein a laterally extending forwardly opening rectangular groove 286 which with the back face 27-1 of the plate 27, forms a guide slot. A stop bar 287 extends horizontally through and is slidable in the guide slot.

Between the stop bar 287 and the cross bar 274, there is secured to and extends rearwardly from the back plate 27, a pivotal mounting means 288, and a lever bar 289 is pivotally mounted intermediate its ends on the pivotal mounting means 288. The lever bar 289 extends generally upwardly and downwardly, and the upper end of the lever bar 289 has a slot and pin connection 290 with the outer end of the stop bar 287, and the lower end of the lever bar 289 has a slot and pin connection 291 with an intermediate portion of the cross bar 274.

Figure 23:
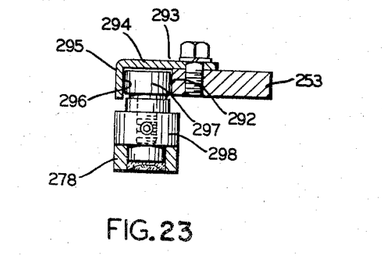
Fig. 23 is a transverse sectional view, as on line 23—23, Fig. 22, looking in the direction of the arrows.

The upper connecting link bar 253 has an outer side face with an angled portion 292. As best shown in Fig. 23, a formed double angled plate member 293 includes an angled outer leg 294 separably secured to the link bar 253 above its angled side face portion 292. The double angled plate member 293 also includes an angled side leg 295 spaced from the angled side face portion 292 of the link bar 253, and forming therewith a forwardly opening angled groove 296 at the rear of the swing bar 278. A roller 297 rolls in the groove 296 and has a stud shaft mounting 298 on the upper end of the swing bar 278.

The time-lock controlled upper stop mechanism 270 as above described in detail, operates as follows: When the door is in the closed position as shown in Fig. 11, and the bolt work has been operated to extend the bolt bars 193 and 194 to the extended door bolting position, the stop bar 287 is located in extended position across the upper groove 242, preventing full downward movement of the upper journal and thrust cup 251, and thus preventing operation of the bolt work to retract the bolt bars. In this locked and stopped position of the bolt work, the stop mechanism 270 cannot operate to withdraw the stop bar 287 from the groove 242, until the time lock 272 has operated to drop the stop arm 276 from obstructing position with respect to the plunger 273. When this occurs, the spring pressed plunger 273 may enter the housing of the time lock.

The other lower stop mechanism 271 is controlled by two combination locks 300 and 301. Mounting means for the locks 300 and 301 consist of a lock mounting plate 302 spaced rearwardly from the door case back plate 27 and parallel thereto, and sets of spacer and connector means each including a cap screw 303 and a tube spacer 304, each spacer 304 being interposed between the plates 302 and 27, and the bore of each spacer registering with a bore in the plate 302 and an internally threaded bore in the plate 27, and the shank of each cap screw 303 extending through a set of the registering bores and being screwed in the threaded bore, and the head of each cap screw clamping against the back face of the plate 302. The locks 300 and 301 are mounted on the back face of the plate 302, and the plate 302 covers a central zone of the back plate 27 and parts thereon or extending thereon.

The combination lock 300 includes a bolt 305 extending towards the bolt bar 193, and the combination lock 301 includes a bolt 306 also extending towards the bolt bar 193. The bolts 305 and 306 are movable in parallel directions towards and away from the bolt bar 193, said directions being perpendicular to the median plane 217. A connecting bar 307 extends upwardly and downwardly between the outer ends of the bolts 305 and 306, and the upper end of the connecting bar 307 has a pivotal connection 308 with the outer end of the upper bolt 305, and the lower end of the connecting bar 307 has a pivotal connection 309 with the outer end of the lower bolt 306. The bolts 305 and 306 move in axial directions equally spaced above and below a horizontal plane passing through the horizontal axis 254 of the door.

At the midpoint of the connecting bar 307, a pivotal connection 310 is mounted. Between the median plane 217 and the bolt bar 194, a guide and pivot block 311 is mounted on the back face 27–1 of the back plate 27. The guide and pivot block 311 has formed therein a rearwardly opening horizontal groove 312 having a rectangular cross-section. A longitudinally extending bolt 313 having a rectangular cross-section slidably fits in the groove 312.

A bell crank 314 has a pivotal mounting 315 connecting it to the block 311, the axis of pivoting being horizonal and above the bolt 313. The bell crank 314 includes a downwardly extending arm 316 with inner and outer bifurcated end pieces 317 and 318. The inner end piece 317 has a slot and pin connection 319 with the bolt 313. A connecting bar 320 extends between the connecting bar 307 and the bell crank outer end piece 318. One end of the connecting bar 320 is pivoted to the connecting bar 307 by the pivotal connection 310. The other end of the connecting bar 320 is pivoted to the bell crank outer end piece 318 by a pivotal connection 321.

Figure 27:
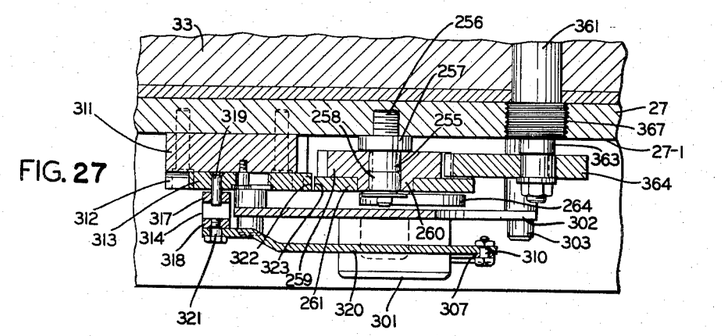
Fig. 27 is an enlarged fragmentary horizontal view as on line 27—27, Fig. 11, illustrating other details of construction of the common operating mechanism.

The bolt 313 has an inner stop end 322 which extends beyond the block 311 towards the median plane 217, and the crank disk 261 is formed with an outwardly opening radial notch 323 which becomes aligned with and receives the bolt stop end 322, when the door parts are in the positions shown in Figs. 11 and 27. In these positions, as above stated, the door 13 is closed in the opening of the frame 11, the bolt bars 193 and 194 are in their extended door bolting position, and the combination lock bolts 305 and 306 are in extended position, and maintain the bolt 313 in its extended position locking the crank disk 261 against rotation.

Figure 28:
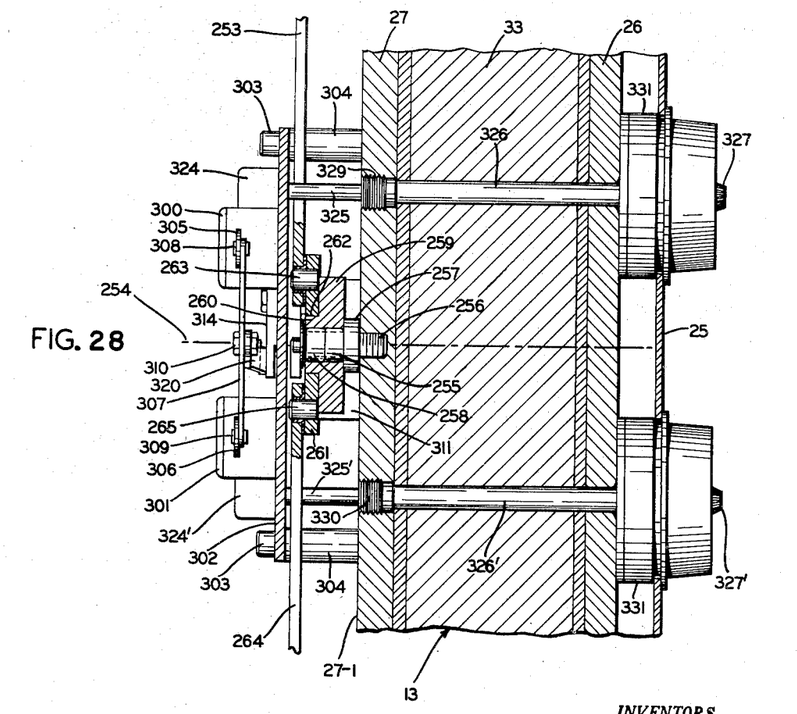
Fig. 28 is an enlarged fragmentary vertical sectional view, as on line 28—28, Fig. 11, illustrating additional details of construction of the common operating mechanism.

As best shown in Fig. 28, the upper combination lock 300 includes a gear operated combination setting mechanism of usual construction within a housing 324, and including an upper combination setting shaft 325 extending forwardly through the door 13, and as shown through a horizontal tube 326, outwardly beyond the door front face 25, where a dial knob 327 is secured on the outer end of the shaft 325.

Similarly, the lower combination lock 301 includes a gear operated combination setting mechanism of usual construction within a housing 324', and including a lower combination setting shaft 325' extending forwardly through the door 13, and as shown through a horizontal tube 326', outwardly beyond the door front face 25, where a dial knob 327' is secured on the outer end of the shaft 325'.

Figure 25:
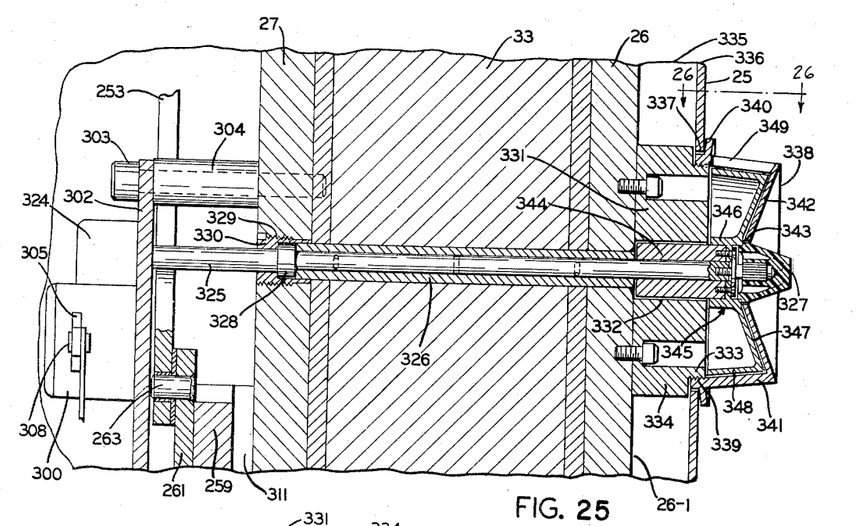
Fig. 25 is an enlarged fragmentary transverse sectional view as on line 25—25, Fig. 1, illustrating details of construction of one of the combination lock dials and other parts included in the common operating mechanism.

Referring to Fig. 25, showing preferred details of construction of the shaft 325 and associated parts, the shaft 325 is preferably provided with an annular shoulder flange 328 intermediate its ends. Tube 326 is welded at its front end to the door case front plate 26. The shaft 325 is separable from its associated parts within the housing 324. The shaft shoulder flange 328 seats against the rear end of the tube 326 within an enlarged internally threaded bore 329 formed in the door case back plate 27. An externally threaded internally flanged sleeve 330 is screwed in the bore 329 and its flange seats against the rear face of the shaft shoulder flange 328, thereby restraining the shaft 326 against endwise longitudinal movement in the door 13.

On the front face 26–1 of the door case front wall 26 there is secured an annular spacer and mounting block 331 having a central bore 332 and an externally threaded outer end portion 333 whose diameter is less than the diameter of the main body portion 334 of the block 331.

The door 13 includes a rectangular front cover shell 335 having a front wall 336 spaced forwardly from the front plate 26, and having formed therein a circular opening 337 concentric with the common horizontal axis of the shaft 325 and the main body portion 334 of the block 331. The diameter of the opening 337 is slightly less than the diameter of the block main body portion 334, and the shell front wall 336 is spaced forwardly of the front end of the body portion 334, and the threaded outer end portion 333 of the block 331 extends through the shell front wall opening 337. A cupped dial index housing 338 has an internally threaded inner end portion 339 screwed on the externally threaded outer end portion 333 of the block 331, and the housing 338 is formed with a radially outwardly extending annular flange 340 which overlaps the outer face portions of the cover shell front wall 336 about the opening 337. The housing 338 furthermore includes a frusto-conical body portion 341 extending forwardly from the flange 340 and an inverted frusto-conical outer end wall 342 extending inwardly and rearwardly from the outer end of the body portion 341 and having formed therein a central opening 343.

The forward end of the shaft 325 extends beyond the front face of the block 331 and terminates within the stationary housing 338. A sleeve mounting head 344 is secured on the forward end of the shaft 325 and is located in the bore 322 of the block 331 and extends beyond the front face thereof, short of the front end face of the shaft 325. A dial shell 345 is located within the index housing 338, the dial shell 345 having a central hub 346 connected to the sleeve mounting head 344. The dial shell 345 furthermore include a frusto-conical disk portion 347 extending outwardly from the hub 346 and a frusto-conical rim portion 348 extending rearwardly from the outer periphery of the disk portion 347.

The disk portion 347 of the rotary dial shell 345 is adjacent the inner face of the housing frusto-conical end wall 342, the disk portion 347 and end wall 342 having similar conical angles. Also, the rim portion 348 of the dial shell 345 is adjacent the inner face of the housing frusto-conical body portion 341, the rim portion 348 and the portion 341 having similar conical angles.

Figure 26:
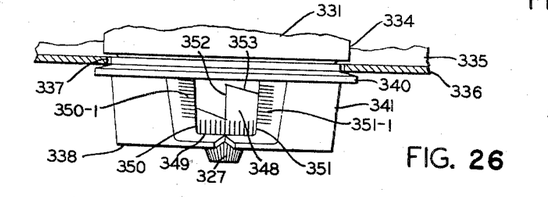
Fig. 26 is a fragmentary top plan view looking in the direction of the arrows 26—26, Fig. 25.

The housing frusto-conical body portion 341 has formed therein an upper rectangular opening 349 having side edges 350 and 351 as shown in Fig. 26. The outer face of the body portion 341 has inscribed therein a set of index marks 350–I intersecting the opening edge 350, and a set of index marks 351–I intersecting the opening edge 351. If any index mark 350–I were prolonged in the direction of the marks 351–I, it would extend between a pair of the index marks 351–I.

The outer face of the frusto-conical rim portion 348 of the dial shell 345 has inscribed therein a frusto-conical element 352 and a helix turn 353 extending around the outer face of the frusto-conical rim portion between the ends of the element.

The dial knob 327, secured to the end of the shaft 325, extends through the opening 343 of the housing 338.

By the above described construction of the housing 338 and dial shell 345, rapid setting of the combination of the lock 300 is attainable as is set forth in detail in a co-pending application for patent.

Referring particularly to Figs. 11, 16, 24, and 27, the rotatable spoke handle unit 24 is rotatably mounted on the front end of a main shaft 360, which through the intervention of the common operating mechanism 23, is adapted to be rotated 90° from the position shown in Fig. 11 to the position shown in Fig. 16, and the reverse, during the opening and closing cycles of operation of the several mechanisms of the door 13.

The main shaft 360 extends horizontally through the door, and as shown through a horizontal bearing tube 361. The front end portion 362 of the main shaft 360 extends forwardly beyond the front face of the cover shell front wall 336, the spoke handle unit 24 being also located beyond the front face of the cover shell front wall.

The rear end portion 363 of the main shaft 360 extends rearwardly beyond the back face 27–1 of the door case back plate 27, and a bolt work drive gear sector 364 is secured on the rear end portion 363 of the main shaft 360 beyond the back face of the back plate 27.

The drive gear sector 364 is meshed with the gear wheel 259 which in turn, as above stated, is connected to the bolt work crank disk 261.

Figure 24:
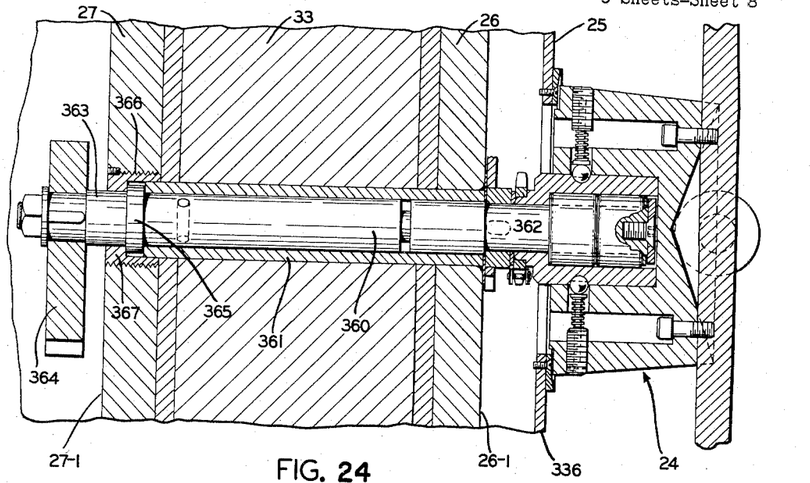
Fig. 24 is an enlarged fragmentary horizontal sectional view of the construction, as on line 24—24, Fig. 1, illustrating details of the rotatable spoke handle unit and other parts of the common operating mechanism.

Referring to Fig. 24, showing preferred details of construction of the main shaft 360 and associated parts, the shaft 360 is preferably provided with an annular shoulder flange 365 intermediate its ends. The bearing tube 361 is welded at its front end to the door case front plate 26. The shaft rear end portion 363 is separably connected with the drive gear sector 364. The shaft shoulder flange 365 seats or thrust reacts against the rear end of the tube 361 within an enlarged internally threaded bore 366 formed in the door case back plate 27. An externally threaded internally flanged sleeve 367 engirdles the rear end portion 363 of the shaft 360, and the sleeve 367 is screwed in the bore 366 and its flange seats against the rear face of the shaft shoulder flange 365, thereby restraining the rotatable shaft 360 against endwise longitudinal movement in the door 13.

We claim:

1. Bolt work in combination with a door and frame, the frame including members bordering an opening, a door dimensioned for fitting in the opening hingedly connected to the frame for moving to and from closed position, said frame members including opposite side members and the door including opposite side members alignable with the frame side members when the door is closed, each side member having a length and a rear surface, each of the door side members having a groove formed lengthwise therein spaced forwardly from the rear surface thereof and opening in a direction away from its alignable frame side member to form a tongue extending lengthwise between the groove and rear surface directed away from the frame side member, bolt bars slidably mounted extending lengthwise on the door at the door side members, each bolt bar having a U-shaped cross section forming two legs with a groove therebetween opening toward its associated frame side member, one leg of each bolt bar being engaged in its respective door side member groove and the other leg of each bolt bar being engaged with its associated frame side member rear surface with the door side member tongues being engaged in the bolt bar grooves when the bolt bars are extended toward the frame side members, and means on the door operative to extend and retract the bolt bars to and from engagement with the frame side members.

2. Bolt work in combination with a door and frame as defined in claim 1 in which the means operative to extend and retract the bolt bars includes toggle mechanism means on the door, and slot and slot engaging means associated with the toggle mechanism means for maintaining the bolt bars parallel with the side members.

3. Bolt work in combination with a door and frame, the frame including members bordering an opening, a door dimensioned for fitting in the opening hingedly connected at one side to the frame for swinging to and from closed position, said frame members including opposite side members and the door including opposite side members alignable with the frame side members when the door is closed, each side member having a length and a rear surface, at least the one door side member opposite from the door hinged side having a groove formed lengthwise therein spaced forwardly from the rear surface thereof and opening in a direction away from its alignable frame side member to form a tongue extending lengthwise between the groove and rear surface directed away from said alignable frame side member, a bolt bar slidably mounted extending lengthwise on said one door side member, the bolt bar having a U-shaped cross section forming two legs with a groove therebetween opening toward said alignable frame side member, one leg of the bolt bar being engaged in said one door side member groove and the other leg of the bolt bar being engaged with said alignable frame side member rear surface with said one door side member tongue being engaged in the bolt bar groove when the bolt bar is extended toward said alignable frame side member, and means on the door operative to extend and retract the bolt bar to and from engagement with said alignable frame side member.

4. Bolt work in combination with a door and frame as defined in claim 3 in which the means operative to extend and retract the bolt bar includes toggle mechanism means, and slot and slot engaging means associated with the toggle mechanism means for maintaining the bolt bar parallel with its associated side members.

5. Bolt work in combination with a door and frame as defined in claim 4 in which the slot and slot engaging means associated with the toggle mechanism means includes a roller on the toggle mechanism means engaged and movable in guide slot means formed on the door.

6. Bolt work in combination with a door and frame, the frame including members bordering an opening, a door dimensioned for fitting in the opening hingedly connected at one side to the frame for swinging to and from closed position, said frame members including opposite side members and the door including opposite side members alignable with the frame side members when the door is closed, each side member having a length, bolt bar means mounted on each of the door side members extending lengthwise thereof for movement to and from engagement with the frame side members, pairs of vertically spaced link bars, one link bar of each pair being pivotally connected to one of the bolt bars and the other link bar of each pair being pivotally connected to the other of the bolt bars, the link bars of each pair being pivotally connected to each other at a second point spaced between said bolt bars, a roller mounted at said second spaced pivot point of each link bar pair engaged and movable in a guide slot formed on the door, each guide slot extending substantially parallel to the bolt bars for maintaining the bolt bars parallel to their associated side members, and crank means pivotally connected to each pair of link bars at said second spaced pivot points for moving the rollers in said guide slots to cause the link bars to move the bolt bars to and from engagement with the frame side members.

7. Bolt work in combination with a door and frame, the frame including members bordering an opening, a door dimensioned for fitting in the opening hingedly connected at one side to the frame for swinging to and from closed position, said frame members including opposite side members and the door including opposite side members alignable with the frame side members when the door is closed, bolt bar means mounted on one of the frame and door side members extending lengthwise thereof for movement to and from engagement with the other of said frame and door side members at least at the side of the door opposite from said hingedly connected side, toggle mechanism means operative to extend and retract the bolt bar to and from engagement with its alignable side member, said toggle mechanism means including at least two vertically spaced link bars pivotally connected to the bolt bar and crank means pivotally connected to each of the link bars at second points spaced from the bolt bar, slot and slot engaging means operatively connected with the toggle mechanism means for maintaining the bolt bar parallel with its associated side members, and the slot and slot engaging means including rollers mounted at said link bars, second pivot points engaged and movable in guide slots with the guide slots extending substantially parallel to the bolt bar.

8. Bolt work in combination with a door and frame as defined in claim 7 in which the crank means includes a connecting bar pivoted to each of the link bars, and rotatable means pivotally connected to the connecting bars spaced from the link bars for moving said connecting and link bars to move the bolt bar to and from engagement with its alignable side member.

9. Bolt work in combination with a door and frame as defined in claim 8 in which lock means is mounted engageable with the rotatable means for selectively blocking rotation of the rotatable means when the bolt bar is engaged with its alignable side member.

10. Bolt work in combination with a door and frame as defined in claim 8 in which lock means is mounted and selectively positionable for blocking movement of at least one of the slot and slot engaging means rollers in its associated guide slot.

11. Bolt work in combination with a door and frame as defined in claim 8 in which the rotatable means includes a circular disc, and the circular disc has a slot formed therein opening outwardly thereof; in which combination lock means is mounted for being selectively engaged in the circular disc slot for blocking rotation of said disc when the bolt bar is engaged with its associated side member; and in which timelock means is mounted for selective engagement across one of the slot and slot engaging means, guide slots for blocking movement of the roller engaged in said guide slot when the bolt bar is engaged with its associated side member.

References Cited in the file of this patent

UNITED STATES PATENTS

| | | |
|---|---|---|
| 200,823 | Damon | Mar. 5, 1878 |
| 246,748 | Gerard | Sept. 6, 1881 |
| 280,294 | Corliss | June 26, 1883 |
| 1,444,446 | Bartels | Feb. 6, 1923 |
| 1,483,541 | Basart | Feb. 12, 1924 |
| 1,749,203 | Wolters | Mar. 4, 1930 |
| 2,240,400 | Johnson | Apr. 29, 1941 |
| 2,347,705 | Mosler | May 2, 1944 |